United States Patent
Venizelos et al.

(10) Patent No.: US 8,976,685 B1
(45) Date of Patent: Mar. 10, 2015

(54) DYNAMIC PRIORITY IN WIRELESS MOBILE COMMUNICATION SYSTEM

(75) Inventors: Paul Venizelos, Ridgewood, NJ (US);
Jingyi Zhou, South River, NJ (US);
Mark P. Wojcik, Metuchen, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 829 days.

(21) Appl. No.: 12/898,227

(22) Filed: Oct. 5, 2010

(51) Int. Cl.
*H04W 72/10* (2009.01)

(52) U.S. Cl.
USPC ........................................ 370/252

(58) Field of Classification Search
None
See application file for complete search history.

(56) References Cited

U.S. PATENT DOCUMENTS

| | | | | |
|---|---|---|---|---|
| 5,787,345 A | * | 7/1998 | Moon | 455/436 |
| 7,489,690 B2 | | 2/2009 | Kakadia | |
| 8,213,422 B2 | * | 7/2012 | Casey | 370/389 |
| 2004/0017825 A1 | * | 1/2004 | Stanwood et al. | 370/468 |
| 2006/0279256 A1 | * | 12/2006 | Bletsas | 320/128 |
| 2009/0168790 A1 | | 7/2009 | Lee | |
| 2009/0285196 A1 | | 11/2009 | Lee et al. | |
| 2012/0028626 A1 | * | 2/2012 | Marocchi et al. | 455/422.1 |

* cited by examiner

*Primary Examiner* — Rhonda Murphy

(57) ABSTRACT

A priority allocation system may be adapted to regulate the priority which different users of a wireless mobile communication system are given to one or more of its various services. It may include a priority level data storage system, a priority enforcement system, an administrator interface, and a subscriber interface. The priority data storage system may be configured to store priority information for each of a plurality of subscriber groups. Each subscriber group may be assigned to one or more wireless mobile communication devices. The priority information for each subscriber group may be indicative of one or more priorities relating to use of the mobile communication system by all of the wireless mobile communication devices which are assigned to the subscriber group.

23 Claims, 2 Drawing Sheets

| 201 ↘ | 203 ↘ | 205 ↘ | 207 ↘ |
|---|---|---|---|
| Subscriber Group | Sub-Group | Normal ARP/PVI/PCI | Priority ARP/PVI/PCI |
| Test Mobile | A | 9 / Y / N | 1 / N / Y |
| NGN Gets | A | 9 / N / Y | 2 / N / Y |
| | B | 9 / N / N | 3 / N / N |
| | C | 9 / Y / N | 4 / N / N |
| FEMA | A | 9 / Y / N | 4 / N / Y |
| | B | 9 / Y / N | 5 / Y / Y |
| | C | 9 / Y / N | 6 / Y / Y |
| Smart Grid | A | 9 / Y / N | 6 / N / N |
| Consumer | A | None / Y / N | None / Y / N |

| Subscriber Group | Sub-Group | Normal ARP/PVI/PCI | Priority ARP/PVI/PCI |
|---|---|---|---|
| Test Mobile | A | 9 / Y / N | 1 / N / Y |
| NGN Gets | A | 9 / N / Y | 2 / N / Y |
| | B | 9 / N / N | 3 / N / N |
| | C | 9 / Y / N | 4 / N / N |
| FEMA | A | 9 / Y / N | 4 / N / Y |
| | B | 9 / Y / N | 5 / Y / Y |
| | C | 9 / Y / N | 6 / Y / Y |
| Smart Grid | A | 9 / Y / N | 6 / N / N |
| Consumer | A | None / Y / N | None / Y / N |

| Subscriber Group | Application | Normal QCI | Priority QCI | Priority Ceases |
|---|---|---|---|---|
| NGN Gets | VoIP | 1 | 1 | 25% |
| | Video Conf | 4 | 2 | 15% |
| | Date | 9 | 6 | 15% |
| FEMA | VoIP | 1 | 1 | 50% |
| | Steaming Video | 4 | 2 | 40% |
| | Data | 9 | 6 | 30% |
| Smart Grid | Data | 9 | 4 | 20% |

FIG. 3

DYNAMIC PRIORITY IN WIRELESS MOBILE COMMUNICATION SYSTEM

BACKGROUND

TECHNICAL FIELD

This disclosure relates to wireless mobile communication systems, including the way in which users are granted priority to their limited resources.

DESCRIPTION OF RELATED ART

Wireless mobile communication systems are often limited in the resources which they can provide. For example, a cellular network may not be able to handle more than a certain number of users within a geographic region.

A wide variety of events, such as catastrophes or special events, can result in a particularly heavy load being placed upon a wireless communication system by its users. During such events, the system may become overloaded and unable to provide all of its services to some users all the time.

Some users, therefore, may temporarily be deprived of one or more services which are offered by the wireless mobile communication system. A cell phone user, for example, may not be able to place a voice call and/or may not be able to send or receive data.

The need for some users to obtain services provided by a wireless mobile communication system may be greater than the need of others. For example, during a catastrophic event, emergency personnel may have a greater need for the services of a wireless mobile communication system than bystanders to the event.

Wireless mobile communication systems have been equipped with the ability to grant some users priority to its services over others. For example, the National Communications System (NCS) permits authorized users to obtain priority to cellular telephone service by preceding the telephone number with a special priority access code. However, these systems can impose additional burdens on the users in order to obtain priority and may lack flexibility in the way priority is provided.

SUMMARY

A priority allocation system for a wireless mobile communication system may include a priority data storage system, an administrator interface, and a priority enforcement system:

The priority data storage system may be configured to store priority information for each of a plurality of subscriber groups. Each group may be assigned one or more wireless mobile communication devices. The priority information for each subscriber group may be indicative of one or more priorities relating to use of the mobile communication system by all of the wireless mobile communication devices which are assigned to the subscriber group.

The administrator interface may be to the priority data storage system and may be configured to allow an administrator of each subscriber group to set and change the priority information for each subscriber group on a global basis.

The priority enforcement system may be configured to enforce the priorities as indicated by the priority information.

The priority allocation system may include a subscriber interface to the priority data storage system. The subscriber interface may be configured to allow a user of each of the wireless mobile communication devices to set a user setting specifying whether priority should be activated on the user's wireless mobile communication device until that user setting is changed. The priority enforcement system may be configured to enforce the priorities in accordance with the user settings.

The priority information for each subscriber group may separately specify the one or more priorities for each of a plurality of different types of communication applications that may be used by the wireless mobile communication devices assigned to the subscriber group.

The priority information for each subscriber group may separately specify the one or more priorities for when the wireless mobile communication devices within the subscriber group are using a home network portion of the wireless mobile communication system and for when the wireless mobile communication devices within the subscriber group are using a roaming network portion of the wireless mobile communication system.

The priority information for each subscriber group may specify a resource utilization threshold above or below which users within the subscriber group are to be provided each of the one or more priorities.

The administrator interface may include a website which each administrator can access.

The one or more priorities may include an allocation and retention priority, a quality of service class identifier, a pre-emption capability, and/or a pre-emption vulnerability.

The one or more priorities may include flow priority, a maximum flow, and an Inter User Priority.

The subscriber interface may be accessible by each user of one of the wireless mobile communication devices dialing a number.

The subscriber interface may include a software application on each of the wireless mobile communication devices.

The subscriber interface may include a website at which each user of each of the wireless mobile communication devices can access.

The subscriber interface may include a user-operated control on each of the wireless mobile communication devices.

The different types of communication applications may include a video application, a data application, and/or a voice application.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

FIG. 3 illustrates another example of priorities which may be stored in a priority data storage system.

DETAILED DESCRIPTION OF ILLUSTRATIVE EMBODIMENTS

Figures 1, 2:
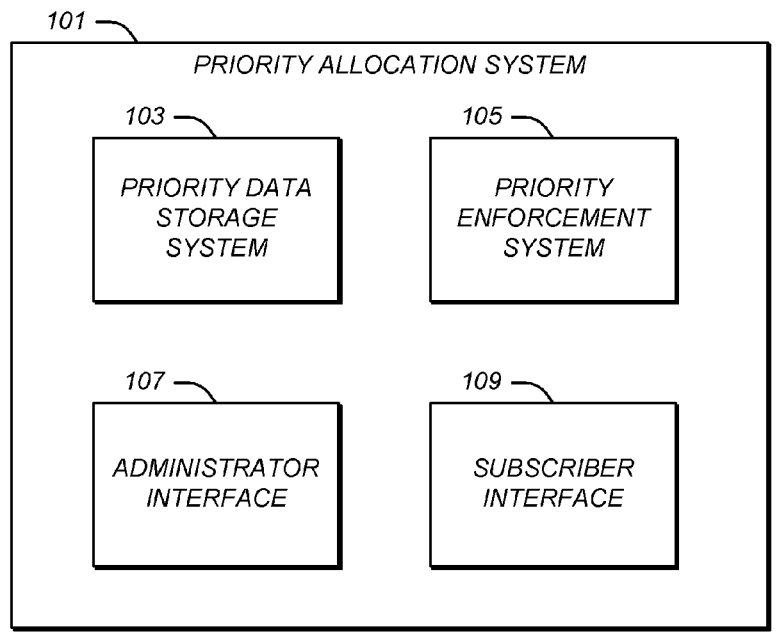
FIG. 1 illustrates a priority allocation system which may be part of a mobile communication system.
FIG. 2 illustrates an example of priorities which may be stored in a priority data storage system.

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

FIG. 1 illustrates a priority allocation system which may be part of a mobile communication system.

As illustrated in FIG. 1, a priority allocation system 101 may include a priority level data storage system 103, a priority enforcement system 105, an administrator interface 107, and a subscriber interface 109. The priority allocation system 101 may include additional components and/or not all of the components which have just been identified.

The priority allocation system 101 may be adapted to regulate the priority which different users of a wireless mobile communication system are given to one or more of its various services.

The wireless mobile communication system may be of any type. For example, it may consist of or include a cellular telephone network and/or a cellular data network. The wireless mobile communication system may include other types of network systems, such as the internet and/or a plain old telephone system, and gateways to them.

Each user may use a wireless mobile communication device. The wireless mobile communication device may be of any type. For example, the wireless mobile communication device may consist of or include a cell phone, a smart cell phone, a PDA, a laptop computer, specialty government/public safety devices or a device used for machine to machine communications.

The priority data storage system 103 may be any type of data storage system. It may consist of or include one or more hard disk drives, RAMS, and/or any other type of non-transitory, tangible, storage media. It may be at one location or distributed across multiple locations. It may have interfaces and interact with one or more functional element engaged with the cellular network, the transport network, priority services and administration of such services.

The priority data storage system 103 may be configured to store priority information for each of a plurality of subscriber groups. Each subscriber group may be assigned to one or more wireless mobile communication devices. The priority information for each subscriber group may be indicative of one or more priorities relating to use of the mobile communication system by all of the wireless mobile communication devices which are assigned to the subscriber group.

The subscriber groups may be of any type. For example, the subscriber groups may consist of or include governmental agencies, such as police departments, fire departments, utilities, transportation departments, telecommunication departments, and/or finance departments. The subscriber groups may include non-governmental groups, such as hospitals and/or private ambulance services.

The priorities may be of any type and may be specified in any way. For example, the priorities may be based on the different types of communication applications which users within a particular subscriber group may use. The priority which is given may be given for each different type of communication application. For example, a voice application may be given a very high priority, a data application may be given a medium priority, and a video application may be given a low priority.

Different priorities may in addition or instead be assigned based on whether the user is communicating within the users home network or is roaming outside of the home network. Different priorities may be assigned based on which network is being used.

One or more of the priorities may include a specification of a resource utilization threshold above or below which users within the subscriber group are to be provided priority. For example, a priority may specify that members of the subscriber group are to be given priority to voice services up until 75% of the available voice services are being utilized, either by members of the subscriber group or all users at large. Conversely, a priority may specify that no member of a subscriber group is to be granted a priority until usage of the resources reaches a stated threshold.

A different priority may in addition or instead be specified for each different type of service which is provided by a wireless mobile communication system. In a 4G network system, for example, one priority may be provided for what is known as Allocation and Retention Priority (ARP), a different priority may be specified for what is known as Quality of Service Class Identifier (QCI) a still different priority may be provided for what is known as Pre-Emption Capability Indicator (PCI), and/or a still different priority may be provided for what is known as Pre-Emption Vulnerability Indicator (PVI). When EV-DO network technology is used, for example, one priority may be provided for Flow Priority, a different priority may be provided for Max_Per_Flow, and a still different priority may be provided for Inter User Priority. When using other types of wireless network communication systems, such as GSM/UMTS, HSPA/HSDPA, and/or WiMAX, the different services provided by these network communications may similarly be given different priorities.

The priorities may in addition or instead be based on a time of day. For example, the priority given during working hours may be different than the priority given during non-working hours.

The priorities may in addition or instead be allocated based on other types of classifications.

The priority enforcement system 105 may be configured to enforce the priorities as indicated by the priority information in the priority data storage system 103. Thus, for example, the priority enforcement system 105 may be configured to allow a user with a higher priority to make a voice call, while blocking a user with a lower priority from doing the same.

To effectuate enforcement, the priority enforcement system 105 may be configured to receive a request for service from a particular user, to query the priority data storage system 103 for priority information relating to that requested service, and to implement the priority which is provided in the priority data storage system 103.

The administrator interface 107 may be configured to allow an administrator of each subscriber group to set and change the priority information for each subscriber group on a global and/or an individual basis. For example, the administrator interface may allow the administrator to set the global priority level at which every member in a subscriber group may obtain voice communication services. A single setting by the group administrator may be effective to control the priority received by each member of the subscriber group for the priority or priorities relating to that setting. As indicated, the administrator interface 107 may additionally or instead be configured to allow the administrator to set the priority for each member of the subscriber group on an individual basis.

The administrator interface 107 may be of any type. For example, it may include a website at which an administrator may log in and effectuate the setting and/or changes of priorities. The administrator interface 107 may in addition or instead be configured to receive priority assignments over the telephone and/or through any other communication means.

The subscriber interface 109 may be configured to allow a user of each of the wireless mobile communication devices to set a user setting specifying whether one or more of the priorities are to apply to use of the user's wireless mobile communication device. The subscriber interface 109 may configure the user setting until it is later changed. The priority enforcement system 105 may be configured to enforce the priorities in accordance with the user settings. The user settings may be considered part of the priority information.

The subscriber interface 109, therefore, may enable each user to specify whether the user wishes to receive the priorities which have been made available to the user. Once set, a user setting may continue to remain in force until later changed by the user and/or administrator. A single user setting may be used in connection with all assigned priorities or a different user setting may be provided for each assignment priority.

The subscriber interface 109 may be of any type. For example the subscriber interface may include a number which the user may dial, such as a telephone number or a special code. Once connected, the subscriber interface 109 may use voice prompts or other means to communicate with the user, thus enabling the user to make changes to user's setting(s). The subscriber interface 109 may in addition or instead include a software application within the user's wireless mobile communication device which is specifically configured to enable the user to make changes to the user setting(s). The subscriber interface 109 may in addition or instead include a website which each user of a wireless mobile communication device can access and similarly make changes to the user's setting(s). The subscriber interface 109 may in addition or instead include one or more user-operated controls on each of the wireless mobile communication devices. For example, a wireless mobile communication device may include an on-off switch, which may be either a mechanical switch or a virtual on-screen switch. When turned off, all of the priorities allocated to the user may be disabled. Conversely, when turned on, all the priorities allocated to users may be enabled. When a user has allocated multiple priorities, a separate user-control may instead be provided for each priority. Conversely, a single user control may control them all simultaneously.

The priority allocation system 101 may be a stand-alone system or may be part of one or more other systems. For example, the priority allocation system 101 may be included within Mobility Management Equipment (MME). All or portions of the priority allocation system 101 may in addition or instead be included within base stations which communicate with wireless mobile communication devices and/or within the wireless mobile communication devices themselves. The priority allocation system 101, as well as each of its components, may be distributed across more than a single device.

FIG. 2 illustrates an example of priorities which may be stored in a priority data storage system.

The priority data storage system may be the priority data storage system 103 illustrated in FIG. 1 or any other priority data storage system. Similarly, the data which is stored in the priority data storage system 103 may be different than the data illustrated in FIG. 2.

As illustrated by a Subscriber Group column 201, the names of each subscriber group may be entered and stored. Although only five groups are listed, a larger or smaller number may be specified instead. The names may be in any form, such as in a form which is descriptive of the subscriber group.

As illustrated by a Sub-Group column 203, each Subscriber Group may be broken down into sub-groups. The names of each sub-group may be in any form. Each sub group may be based on business structures and/or priority needs.

As illustrated by a Normal ARP/PVI/PCI column 205, the normal priority levels of each sub-group may be specified. "Normal" may be a reference to the priority levels which the sub-group receives in the absence of a higher priority being requested by, for example, a user setting. As illustrated in this column, any type or types of priorities may be specified. In this example, which may apply to a 4G network system, priority levels for Allocation and Retention Priority (ARP), Pre-Emption Vulnerability Indicator (PVI) and Pre-Emption Capability Indicator (PCI) are specified. One or more different priorities may be specified in addition or instead.

As illustrated by a priority ARP/PVI/PVC column 205, the changes that are to take place in each of these normal priorities may be specified when a higher priority is requested, such as through a change in a user setting. As can be seen from a close examination of FIG. 2, some priorities may be unchanged, while others can be increased.

As should be apparent from FIG. 2, there may be two different levels of priorities. The lower level may apply by default when a user setting does not specify a higher level. The lower level may be applied by default when the user has not specified any user setting and thus be subject to being upgraded when the user setting specifies a higher level. Conversely, the higher priority level may apply by default when the user has not specified any user setting and thus be subject to being downgrade when the user setting specifies a lower level. The lower level of priority may specify that the user is not to receive any priority, rather than a low priority.

FIG. 3 illustrates another example of priorities which may be stored in a priority data storage system. The data illustrated in FIG. 3 may be used in conjunction with the priority data storage system 103 illustrated in FIG. 1 or in any other type of priority data storage system. Similarly, the priority data storage system 103 illustrated in FIG. 1 may contain different data.

As illustrated in FIG. 3, a Subscriber Group column 301 may be populated with the names of various subscriber groups. Again, the names may be in any form, such as in the form of a name which is descriptive of the subscriber group. Although not illustrated in FIG. 3, sub-groups may also be provided.

As illustrated by an Application column 303, the names of the various communication applications which may be run on each wireless mobile communication device which is assigned to a group may be specified. The names of these communication applications may be specified in any form, such as by a name which is descriptive of the application.

As illustrated by a Normal QCI column 305, the normal priorities associated with each application within each subscriber group may be specified. These may be the priorities which the applications are to receive in the absence of a request for a higher priority, as specified, for example, by a user setting. In the example illustrated in FIG. 3, only one type of priority is specified, namely a Quality of Service Class Identifier (QCI). In other embodiments, additional types of priorities may be specified.

As illustrated by a higher Priority QCI column 307, any change in the normal priority QCI column 305 may be specified next when a higher priority QCI column 307 is requested such as by, for example, a change in a user setting.

As illustrated by a Priority Ceases column 309, a cap may be placed upon the wireless mobile communication devices which receive the higher priority when the utilization of the services of the wireless mobile communication system related to the specified application reaches a certain percentage. This cap may be specified in other ways, such as by specifying the maximum number of users which may receive the higher priority. In still other cases, no cap may be specified. In still other cases, a floor may be specified, only above which the higher priority level may be applied. Additional or different priority settings may also be specified.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A priority allocation system for a wireless mobile communication system comprising:
   a priority data storage system configured to store priority information for each of a plurality of subscriber groups, each subscriber group being assigned one or more wireless mobile communication devices and having one or more communication applications,
   the priority information for each communication application of each subscriber group being indicative of one or more priorities,
   each priority for each communication application having a normal priority level and a higher priority level different from the normal priority level,
   the system switching between the normal and higher priority levels for the communication application within the subscriber group based on respective requested priorities and threshold usages of the communication application by the wireless mobile communication devices assigned to the subscriber group;
   an administrator interface to the priority data storage system configured to allow an administrator of each subscriber group to set and change the priority information for each subscriber group on a global basis; and
   a priority enforcement system configured to enforce the priorities for the communication application according to the normal and higher priority levels as indicated by the priority information, with respect to threshold usages of the communication application by the wireless mobile communication devices assigned to each subscriber group.

2. The priority allocation system of claim 1 further comprising a subscriber interface to the priority data storage system configured to allow a user of each of the wireless mobile communication devices to set a user setting specifying whether one or more of the priorities are to apply to use of the user's wireless mobile communication device until that user setting is changed, and wherein the priority enforcement system is configured to enforce the priorities in accordance with the user settings.

3. The priority allocation system of claim 1 wherein the priority information for each subscriber group separately specifies the one or more priorities for each of a plurality of different types of the communication applications that may be used by the wireless mobile communication devices assigned to the subscriber group.

4. The priority allocation system of claim 1 wherein the priority information for each subscriber group separately specifies the one or more priorities for when the wireless mobile communication devices within the subscriber group are using a home network portion of the wireless mobile communication system and for the wireless mobile communication devices within the subscriber group are using a roaming network portion of the wireless mobile communication system.

5. The priority allocation system of claim 1 wherein the priority information for each subscriber group specifies, as the threshold usage, a resource utilization threshold above which or below which users within the subscriber group are to be provided each of the one or more priorities based on the resource utilization of the wireless communication system by the users of the subscriber group.

6. The priority allocation system of claim 1 wherein the administrator interface includes a website which each administrator can access.

7. The priority allocation system of claim 1 wherein the one or more priorities include an allocation and retention priority, a quality of service identifier priority, a pre-emption capability, and a pre-emption vulnerability.

8. The priority allocation system of claim 1 wherein the one or more priorities include flow priority, a maximum flow, and an Inter User Priority.

9. A priority allocation system for a wireless mobile communication system comprising:
   a priority data storage system configured to store priority information for each of a plurality of subscriber groups, each subscriber group being assigned one or more wireless mobile communication devices and having one or more communication applications, the priority information for each communication application of each subscriber group being indicative of one or more priorities, each priority for each communication application having a normal priority level and a higher priority level different from the normal priority level, the system switching between the normal and higher priority levels for the communication application within the subscriber group based on respective requested priorities and threshold usages of the communication application by the wireless mobile communication devices assigned to the subscriber group;

a subscriber interface to the priority data storage system configured to allow a user of each of the wireless mobile communication devices to set a user setting specifying whether one or more of the priorities are to apply to use of the user's wireless mobile communication device until that user setting is changed; and a priority enforcement system configured to enforce the priorities for the communication application according to the normal and higher priority levels as indicated by the priority information and in accordance with the user settings, with respect to the threshold usages of the communication application by the wireless mobile communication devices assigned to each subscriber group.

10. The priority allocation system of claim 9 wherein the priority information for each subscriber group separately specifies the one or more priorities for each of a plurality of different types of the communication applications that may be used by the wireless mobile communication devices assigned to the subscriber group.

11. The priority allocation system of claim 9 wherein the priority information for each subscriber group separately specifies the one or more priorities for when the wireless mobile communication devices within the subscriber group are using a home network portion of the wireless mobile communication system and for the wireless mobile communication devices within the subscriber group are using a roaming network portion of the wireless mobile communication system.

12. The priority allocation system of claim 9 wherein the priority information for each subscriber group specifies, as the threshold usage, a resource utilization threshold above which or below which users within the subscriber group are to be provided each of the one or more priorities based on the resource utilization of the wireless communication system by the users of the subscriber group.

13. The priority allocation system of claim 9 wherein the subscriber interface is accessible by each user of one of the wireless mobile communication devices dialing a number.

14. The priority allocation system of claim 9 wherein the subscriber interface includes a software application on each of the wireless mobile communication devices.

15. The priority allocation system of claim 9 wherein the subscriber interface includes a website which each user of each of the wireless mobile communication devices can access.

16. The priority allocation system of claim 9 wherein the subscriber interface includes a user-operated control on each of the wireless mobile communication devices.

17. A priority allocation system for a wireless mobile communication system comprising:

a priority data storage system configured to store priority information for each of a plurality of subscriber groups, each subscriber group being assigned one or more wireless mobile communication devices and having one or more communication applications, the priority information for each communication application of each subscriber group being indicative of one or more priorities, each priority for each communication application from a plurality of different types of the communication applications having a normal priority level and a higher priority level different from the normal priority level, the system switching between the normal and higher priority levels for the communication application within the subscriber group based on respective requested priorities and threshold usages of the communication application by the wireless mobile communication devices assigned to the subscriber group, the priority information for each subscriber group separately specifying the one or more priorities for each of the plurality of different types of communication applications that may be used by the wireless mobile communication devices assigned to the subscriber group; and a priority enforcement system configured to enforce the priorities for the communication application according to the normal and higher priority levels as indicated by the priority information, with respect to the threshold usages of the communication application by the wireless mobile communication devices assigned to each subscriber group.

18. The priority allocation system of claim 17 wherein the priority information for each subscriber group separately specifies the one or more priorities for when the wireless mobile communication devices within the subscriber group are using a home network portion of the wireless mobile communication system and for the wireless mobile communication devices within the subscriber group are using a roaming network portion of the wireless mobile communication system.

19. The priority allocation system of claim 17 wherein the priority information for each subscriber group specifies, as the threshold usage, a resource utilization threshold above which or below which users within the subscriber group are to be provided each of the one or more priorities based on the resource utilization of the wireless communication system by the users of the subscriber group.

20. The priority allocation system of claim 17 wherein the different types of the communication applications include a video application, a data application, and a voice application.

21. A priority allocation system for a wireless mobile communication system comprising:

a priority data storage system configured to store priority information for each of a plurality of subscriber groups, each subscriber group being assigned one or more wireless mobile communication devices and having one or more communication applications, the priority information for each subscriber group being indicative of one or more priorities, each priority for each communication application having a normal priority level and a higher priority level different from the normal priority level, the system switching between the normal and higher priority levels for the communication application within the subscriber group based on respective requested priorities and threshold usages of the communication application by the wireless mobile communication devices assigned to the subscriber group, the priority information for each subscriber group separately specifying the one or more priorities for when the wireless mobile communication devices within the subscriber group are using a home network portion of the wireless mobile communication system and for the wireless mobile communication devices within the subscriber group are using a roaming network portion of the wireless mobile communication system; and a priority enforcement system configured to enforce the priorities for the communication application according to the normal and higher priority levels as indicated by the priority information, with respect to the threshold usages of the communication application by the wireless mobile communication devices assigned to each subscriber group.

22. The priority allocation system of claim 21 wherein the priority information for each subscriber group specifies, as the threshold usage, a resource utilization threshold above which or below which users within the subscriber group are to be provided each of the one or more priorities based on the resource utilization of the wireless communication system by the users of the subscriber group.

23. A priority allocation system for a wireless mobile communication system comprising:

a priority data storage system configured to store priority information for each of a plurality of subscriber groups, each subscriber group being assigned one or more wireless mobile communication devices and having one or more communication applications, the priority information for each communication application of each subscriber group being indicative of one or more priorities, each priority for each communication application having a normal priority level and a higher priority level different from the first normal priority level, the system switching between the normal priority level and the higher priority levels for the communication application within the subscriber group based on respective requested priorities and threshold usages of the communications application by the wireless mobile communication devices assigned to the subscriber group, the priority information for each subscriber group specifying a resource utilization threshold above or below which users within the subscriber group are to be provided each of the one or more priorities; and a priority enforcement system configured to enforce the priorities for the communication application according to the normal and higher priority levels as indicated by the priority information, with respect to the threshold usages of the communication application by the wireless mobile communication devices assigned to each subscriber group.

* * * * *